(12) United States Patent
Cheng et al.

(10) Patent No.: US 11,443,293 B2
(45) Date of Patent: Sep. 13, 2022

(54) SECURE NETWORK ACCESSING METHOD FOR POS TERMINAL, AND SYSTEM THEREOF

(71) Applicant: CHINA UNIONPAY CO., LTD., Shanghai (CN)

(72) Inventors: Zhiqiang Cheng, Shanghai (CN); Hua Cai, Shanghai (CN); Qi Wang, Shanghai (CN); Zhou He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 1065 days.

(21) Appl. No.: 15/038,164

(22) PCT Filed: Nov. 20, 2014

(86) PCT No.: PCT/CN2014/091728
§ 371 (c)(1),
(2) Date: May 20, 2016

(87) PCT Pub. No.: WO2015/085851
PCT Pub. Date: Jun. 18, 2015

(65) Prior Publication Data
US 2016/0321638 A1 Nov. 3, 2016

(30) Foreign Application Priority Data
Dec. 10, 2013 (CN) .......................... 201310661691.5

(51) Int. Cl.
*G06Q 20/20* (2012.01)
*G06Q 20/38* (2012.01)
*H04L 9/32* (2006.01)

(52) U.S. Cl.
CPC ........... *G06Q 20/206* (2013.01); *G06Q 20/20* (2013.01); *G06Q 20/3829* (2013.01); *G06Q 20/38215* (2013.01); *H04L 9/3263* (2013.01)

(58) Field of Classification Search
CPC .. G06Q 20/20; G06Q 20/206; G06Q 20/3829; H04L 9/3263
See application file for complete search history.

(56) References Cited

U.S. PATENT DOCUMENTS 6,128,738 A * 10/2000 Doyle ................. H04L 63/0823
709/228
6,286,099 B1 9/2001 Kramer
(Continued)

FOREIGN PATENT DOCUMENTS

| CN | 101739771 A | 6/2010 |
|----|-------------|--------|
| CN | 103067402 A | 4/2013 |

(Continued)

OTHER PUBLICATIONS

Tolvanen, Jarkko. "Device Security." (2000). Retrieved from the Internet on May 5, 2022. Retrieved from URL:<http://citeseerx.ist.psu.edu/viewdoc/download?doi=10.1.1.27.1802&rep=rep1&type=pdf>. (Year: 2000).*

(Continued)

*Primary Examiner* — Abhishek Vyas
*Assistant Examiner* — Monica A Mandel
(74) *Attorney, Agent, or Firm* — Anova Law Group, PLLC

(57) ABSTRACT

The present invention relates to the method and the system for initializing secure network access for POS terminals. Said system comprises a terminal backend system and a POS terminal. The POS terminal is provided with: a security module, which was preloaded with a terminal default public key certificate, a private key file, and a CA public key (Continued)

certificate of the terminal backend system in the setting of leaving the factory; a transaction module, which is used for performing the acquiring operation with the following core trading module; and a parameter initializing module, which is used for implementing network access. The terminal backend system is provided with: a core trading module, which determines whether an acquiring transaction is able to be executed based on the transaction unique identifier sent from the POS terminal, and completes the acquiring operation with the above transaction module in the case that the acquiring transaction is able to be executed; and a terminal certificate issuing module, which is used for generating a terminal transaction certificate and returning said terminal transaction certificate to said POS terminal. According to the present invention, remotely and securely initializing network access for POS terminals can be achieved.

5 Claims, 2 Drawing Sheets

(56) References Cited

U.S. PATENT DOCUMENTS

| | | | |
|---|---|---|---|
| 6,327,578 B1* | 12/2001 | Linehan | G06Q 20/02 705/65 |
| 7,249,377 B1* | 7/2007 | Lita | G06F 21/6236 380/255 |
| 2001/0032878 A1* | 10/2001 | Tsiounis | G06Q 20/02 235/379 |
| 2002/0108042 A1* | 8/2002 | Oka | H04L 9/3263 713/175 |
| 2003/0028664 A1* | 2/2003 | Tan | G06F 21/10 709/237 |
| 2006/0031676 A1* | 2/2006 | Vantalon | G06F 21/73 713/176 |
| 2007/0067620 A1* | 3/2007 | Jevans | H04L 63/0823 713/156 |
| 2010/0146250 A1* | 6/2010 | Bergerson | H04L 9/3268 713/1 |
| 2011/0191196 A1 | 8/2011 | Orr et al. | |
| 2014/0025944 A1* | 1/2014 | Maletsky | G06F 21/57 713/150 |
| 2016/0028548 A1 | 1/2016 | Yao et al. | |

FOREIGN PATENT DOCUMENTS

| | | |
|---|---|---|
| CN | 103220270 A | 7/2013 |
| CN | 203071966 U | 7/2013 |
| CN | 103595718 A | 2/2014 |
| CN | 103684768 A | 3/2014 |
| WO | WO-02065696 A1 * | 8/2002 ........... H04L 9/0891 |

OTHER PUBLICATIONS

Bruce Schneier: "Applied Cryptography, Second Edition: Protocols, Algorthms, and Source Code in C", Jan. 1, 2012 (Jan. 1, 2012), XP055346219, Retrieved from the Internet: URL:https://mrajacse. files.wordpress.com/2012/01/applied-cryptography-2nd-ed-b-schneier. pdf [retreived on Feb. 15, 2017].

\* cited by examiner

SECURE NETWORK ACCESSING METHOD FOR POS TERMINAL, AND SYSTEM THEREOF

FIELD OF INVENTION

The present invention relates to network security authentication, in particular, to the method for initializing secure network access for POS terminals and the system for initializing secure network access for POS terminals.

BACKGROUND

Among prior art, domestically in traditional POS industry, terminals still employ outdated technical framework, resulting in issues such as high cost for POS operation and maintenance, and difficulty in promoting new terminal services. As such, in the patent application entitled "A POS SYSTEM AND METHOD FOR MUTUAL AUTHENTICATION IN THE POS SYSTEM (一种 POS 系统以及在 POS 系统内进行双向认证的方法)", with an application number "CN201210331548.5" (refer to as "patent document 1"), the patent applicant has provided a smart POS terminal payment network which adopts a way of secure access to the internet.

However, while smart POS terminals come with great service carrying capacity and scalability, it is also accompanied by the complicacy problem of smart POS terminals. Before each smart point-of-sale terminal accesses to the network, it is required to complete creating and initializing terminal transaction certificates. This is a costly and long term task in large-scale deployment scenarios of smart point-of-sale terminals.

Traditional financial POS terminals utilize a dedicated network to access the acquiring platform. Due to the specificity and the closure property of POS terminal devices, the management of it is consequently incapable of standardized integration, and thus there are various problems such as unitary function, tremendous cost, lack of standardization in maintenance management and the like. Smart POS terminals adopt a way of secure internet access, not only supporting the installation, updating, and uninstallation of applications, but also supporting the access of third-party applications to achieve the function of acquiring. Meanwhile, digital certificates and digital signatures are utilized to perform security authentication for terminals, so as to confirm the safety of POS terminal transactions. Therefore, during the network access procedure of smart POS terminals, terminal transaction certificates are demanded to be created and initialized. Presently, every time a smart POS terminal accesses the network, a terminal transaction certificate and a private key file are generated manually by a trusted authority, and then the terminal transaction certificate and the private key are loaded into a security module by terminal manufacturers. When the smart point-of-sale terminals are being extensively promoted, the transaction certificates are initialized in a manual way, increasing the network access cost of terminals, prolonging the network access period of terminals, and affecting the marketing of smart point-of-sale terminals.

SUMMARY OF INVENTION

In view of above problems, the present invention intends to provide a method and a system for initializing secure network access for POS terminals, with which smart POS terminals are enabled to be initialized remotely and securely for network access.

As mentioned above, the system for initializing secure network access for POS terminals according to the invention comprises a smart terminal security module, a client application, and a smart terminal backend system. The client application of the smart POS terminal utilizes SSL/TLS for securely accessing the terminal backend system, implementing the acquiring service of the smart terminals. When a smart POS terminal leaves the factory, the security module is preloaded with a default terminal certificate and a private key file. This terminal certificate and private key file are only used for establishing a secure channel with the backend system, rather than completing a transaction request. When a smart POS terminal accesses the network, the client application establishes a secure communication to the backend system with the default certificate and the default private key, and then a transaction public/private key pair is generated by a terminal initializing module, meanwhile the information about public keys and terminal unique identifiers (merchant IDs, terminal IDs) and the like are sent to the backend system, where a terminal transaction certificate is generated by a certificate issuing module and returned to the client application, by which the terminal transaction certificate is updated, and then the client application is able to send a transaction request to the backend system, eventually implementing the remote network access initialization for the smart POS terminal.

The method for initializing secure network access for POS terminals according to the invention is used to connect the POS terminal to the backend system of the terminal. Said method comprises: step of setting when leaving the factory, where a terminal default public key certificate, a default private key file, and a CA public key certificate of the terminal backend system are loaded into the POS terminal, wherein said terminal default public key certificate comprises a terminal transaction unique identifier; step of establishing a terminal transaction certificate secure downloading channel, where said terminal default public key certificate, said default private key file, and said CA public key certificate of the terminal backend system are adopted to establish the terminal transaction certificate secure downloading channel, which is used for downloading the terminal transaction certificate, between the POS terminal and the terminal backend system; step of generating a public/private key pair, where the POS terminal generates the terminal transaction public/private key pair; step of uploading information, where the POS terminal send at least said terminal transaction public key and said terminal transaction unique identifier to the terminal backend system; step of issuing a terminal transaction certificate, where the terminal backend system generates the terminal transaction certificate based on the information uploaded from the POS terminal, and returns the generated terminal transaction certificate to the POS terminal through said secure channel for downloading the terminal transaction certificate; step of establishing a secure channel for transaction, where the terminal transaction certificate, the private key file of said terminal transaction public/private key pair, and the CA public key certificate of the terminal backend system are adopted to establish a secure channel for transaction for executing transactions between the POS terminal and the terminal backend system.

Preferably, the method, posterior to said step of establishing a secure channel, further comprises a step of decision making by the terminal backend system, where the terminal backend system determines whether a transaction is able to be executed based on the terminal transaction unique identifier accessed through said secure channel for transaction.

Preferably, in said step of uploading information, the POS terminal sends at least the transaction public key and the terminal transaction unique identifier to the terminal backend system through a mutual authenticated secure terminal transaction certificate downloading channel.

Preferably, in said step of issuing a terminal transaction certificate, the terminal backend system executes certificate signing for the transaction public key and the terminal transaction unique identifier uploaded from the POS terminal to generate the terminal transaction certificate.

Preferably, in said step of issuing a terminal transaction certificate, the terminal backend system returns the generated terminal transaction certificate to the POS terminal through the mutual authenticated terminal transaction certificate secure downloading channel.

Preferably, in said step of generating a public/private key pair, the generated private key file of said terminal transaction public/private key pair is stored in the POS terminal.

According to an aspect of the invention, a system of the invention for initializing secure network access for POS terminals is provided. The system comprises a terminal backend system and a POS terminal. Said POS terminal is provided with a security module, which was preloaded with a terminal default public key certificate, a private key file, and a CA public key certificate of the terminal backend system in a setting when leaving the factory, wherein, a terminal transaction unique identifier is included in said terminal default public key certificate; a transaction module, which is used for performing the acquiring operation with the following core trading module; and a parameter initializing module, which is used for implementing network access. Said terminal backend system is provided with a core trading module, which determines whether an acquiring transaction is able to be executed based on the transaction unique identifier sent from the POS terminal, and completes the acquiring operation with the above transaction module in the case that the acquiring transaction is able to be executed; and a terminal certificate issuing module, which is used for generating a terminal transaction certificate based on the terminal transaction public key and the terminal transaction unique identifier sent from said POS terminal, and returning said terminal transaction certificate to said POS terminal.

Preferably, said security module is deployed on the hardware mainboard of the POS terminal or embedded in the CPU.

Preferably, said parameter initializing module is used for generating the terminal transaction public/private key pair by calling said security module, and for sending the terminal transaction public key and the terminal transaction unique identifier to said terminal backend system as request information before the certificate.

Preferably, said POS terminal and said terminal backend system are connected through a SSL/TLS secure channel.

According to the method of the invention for initializing secure network access for POS terminals and the system of the invention for initializing secure network access for POS terminals, remotely and securely initializing network access for smart POS terminals can be achieved, greatly shortening the network access period of smart POS terminals, saving the network access cost and facilitating the marketization of smart POS terminals.

DESCRIPTION OF EMBODIMENTS

Described below are some of a plurality of embodiments, which intend to provide a basic understanding of the present invention. It is not intended to determine the critical or decisive factors of the invention or to limit the claimed scope of the invention.

Figure 1:
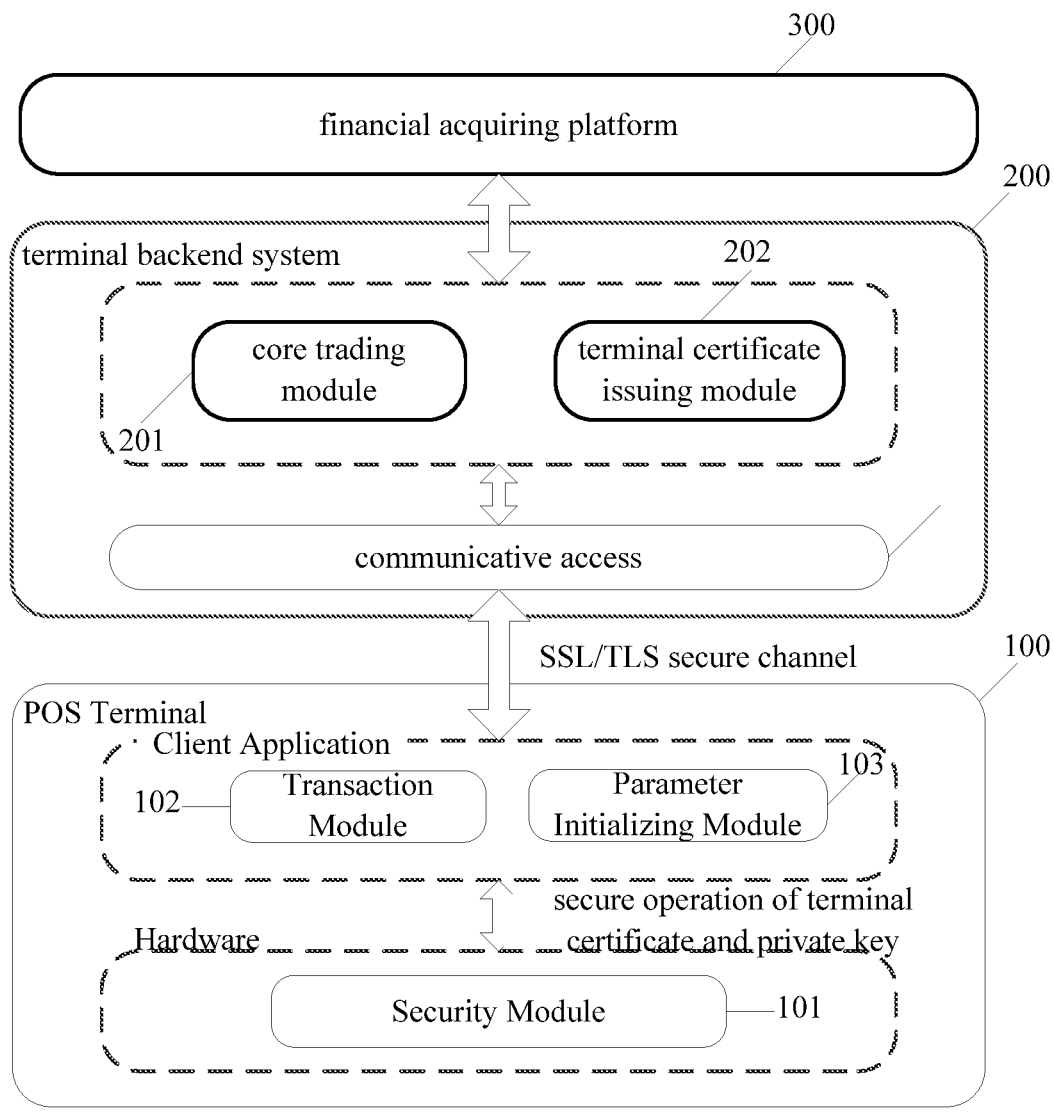
FIG. 1 is a block diagram of the system for initializing secure network access for the POS terminal according to the invention.
Figure 2:
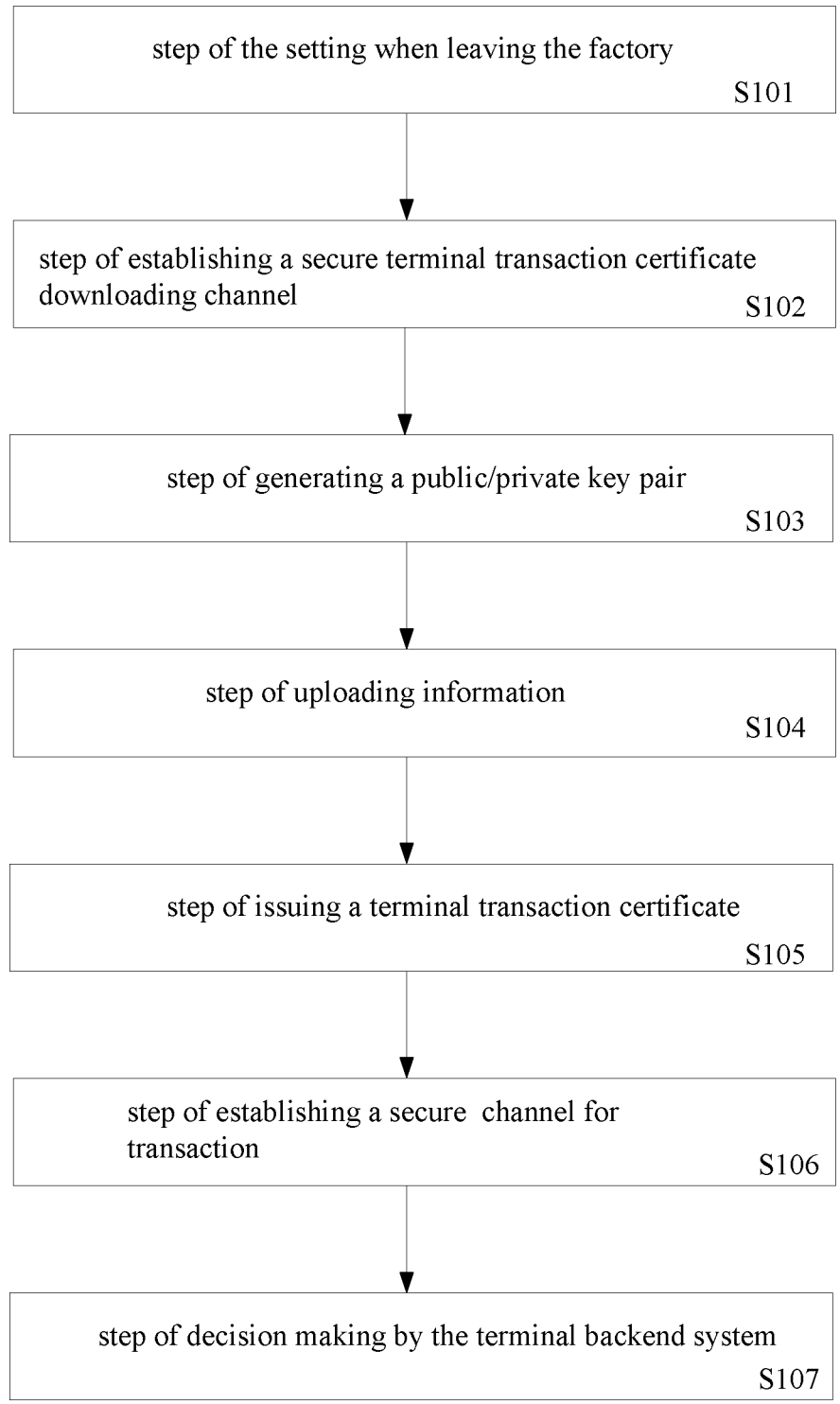
FIG. 2 is a flow chart of the main steps of the method for initializing secure network access for the POS terminal according to the invention.

FIG. 1 is a block diagram of the system for initializing secure network access for the POS terminal according to the invention.

As showed in FIG. 1, the system for initializing secure network access for POS terminals according to the present invention comprises: a POS terminal 100 and a terminal backend system 200. The POS terminal 100 and the terminal backend system 200 are connected by a mutual authenticated secure channel, e.g. SSL/TLS. The terminal backend system 200 and the financial acquiring platform 300 are communicatively connected. The financial acquiring platform 300 does not belong to the scope of the system of the invention for initializing secure network access for the POS terminals, and thereby the illustration of it is omitted herein.

Said POS terminal 100 is provided with: a security module 101, which is preloaded in a setting when the POS terminal 100 leaves the factory with a terminal default public key certificate, a private key file, and a CA public key certificate of the terminal backend system, wherein a terminal transaction unique identifier is included in said terminal default public key certificate; a transaction module 102, which is used for finishing the acquiring operation with the following core trading module 201; and a parameter initializing module 103, which is used for implementing network access, more particularly, for generating the terminal transaction public/private key pair by calling said security module 101, and for sending the terminal transaction public key and the terminal transaction unique identifier to said terminal backend system 200 as request information before the certificate. The transaction module 102 and the parameter initializing module 103 compose the client application of the POS terminal 100.

The security module 101, in which at least the terminal default public key certificate, the private key file and the transaction public key certificate, the private key file, and the CA public key certificate of the terminal backend system are stored, is a hardware component of the POS terminal 100, where the security module 101 may be located on the hardware mainboard of the POS terminal, or may be embedded in the CPU as well. When the POS terminal 100 leaves the factory, the terminal default public key certificate and the private key and the CA public key certificate of the terminal backend system are preloaded in the security module 101 of the POS terminal 100. The preloaded default terminal public key certificate and the private key file are uniformly issued by a trusted authority, who can assign a default terminal public key certificate and a private key file to each of the terminal manufacturers, respectively, or may assign one unified terminal public key certificate and private key file to all terminal manufacturers as well. The default terminal public key certificate and the private key file can only be used for accessing the terminal backend system, performing terminal management, rather than for executing any acquiring transaction operations. The default terminal unique identifier (for example, the terminal unique identifier may be composed of a merchant ID and a terminal ID) is included in the default terminal public key certificate, according to which the terminal backend system distinguishes and determines whether said terminal is able to make the transaction.

Said terminal backend system 200 is provided with: a core trading module 201, which determines whether an acquiring transaction is able to be executed based on the transaction unique identifier sent from the POS terminal 100, and completes the acquiring operation with the above transaction module 102 in the case that the acquiring transaction is able to be executed; and a terminal certificate issuing module 202, which is used for generating a terminal transaction certificate based on the terminal transaction public key and the terminal transaction unique identifier sent from said POS terminal 100, and returning said terminal transaction certificate to said POS terminal 100.

One of the features of the system for initializing secure network access for POS terminals according to the invention is that the POS terminal 100 and the terminal backend system 200 are connected by a mutual authenticated secure channel, e.g. SSL (Secure Socket Layer)/TLS (Transport Layer Security Protocol). The services provided by SSL protocol mainly includes: 1) authenticating users and servers to ensure that the data is sent to the correct client and server; 2) encrypting the data to prevent it from being stolen; 3) maintaining the data integrity to ensure that the data is not altered during transmitting. On the other hand, TLS is used for providing confidentiality and data integrity between two communication applications, which is provided with private and reliable characteristics. Therefore, security is guaranteed in the present invention, because data transmission, and in particular, delivering the terminal transaction certificate is executed through SSL/TLS secure channel.

The method for initializing secure network access for the POS terminal according to the invention is illustrated below. The method for initializing secure network access for the POS terminal according to the invention is a method used for securely connecting the POS terminal to the terminal backend system. Said method mainly includes the following steps:

Step S101 of a setting when leaving the factory: a terminal default public key certificate, a private key file, and a CA public key certificate of the terminal backend system are loaded into the POS terminal, wherein said terminal default public key certificate comprises a terminal transaction unique identifier;

Step S102 of establishing a terminal transaction certificate secure downloading channel: said terminal default public key certificate, said private key file, and said CA public key certificate of the terminal backend system are adopted, and the terminal transaction certificate secure downloading channel which is used for downloading the terminal transaction certificate is established between the POS terminal 100 and the terminal backend system 200;

Step S103 of generating a public/private key pair: the parameter initializing module 103 of the POS terminal 100 calls the security module 101 to generate the terminal transaction public/private key pair, the terminal private key file is stored within the security module 101, meanwhile the terminal transaction public key is returned to the parameter initializing module 103;

Step S104 of uploading information: the parameter initializing module 103 of the POS terminal 100 send at least said terminal transaction public key and said terminal transaction unique identifier to the terminal backend system 200 as csr (certificate signing request) information through mutual authenticated terminal transaction certificate secure downloading channel;

Step S105 of issuing a terminal transaction certificate: the certificate issuing module 202 of the terminal backend system 200 certificate signs said csr information to generate the terminal transaction certificate, and returns the generated terminal transaction certificate to the POS terminal 100 through said secure channel which is used for downloading the terminal transaction certificate;

Step S106 of establishing a secure channel for transaction: the terminal transaction certificate, the private key file of said terminal transaction public/private key pair, and the CA public key certificate of the terminal backend system are adopted to establish a secure channel for transaction for executing transactions between the POS terminal 100 and the terminal backend system.

Step S107 of decision making by the terminal backend system: the core trading module 201 of the terminal backend system 200 determines whether a transaction is able to be executed based on the terminal transaction unique identifier accessed through said secure channel for transaction, and more particularly, a list of the terminal transaction unique identifiers is stored in the core trading module 201. Only if the terminal transaction unique identifier is incorporated in said list, the acquiring transaction will be executed, otherwise it will not be executed.

In addition, prior to the above step S 101 of default setting, there is also needs for the terminal default public key certificate, private key file and the CA public key certificate of the terminal backend system issued from trusted authority to the POS terminal manufacturers (however this step does not fall into the scope of the method for initializing secure network access for POS terminals according to the invention).

In the above method and the system of the invention for initializing secure network access for POS terminals, returning the generated terminal transaction certificate through SSL/TLS to the POS terminal means using a way of SSL/TLS secure access, which not only guarantees initializing the network access of POS terminals remotely and intelligently, but also guarantees the safety of the network access initialization of POS terminals. Therefore, said present invention has the following technical effects:

(1) Enabling the trusted authority to manage each terminal manufacturer conveniently, assigning a default terminal certificate and a default private key to each terminal manufacturer;

(2) Presenting to adopt a way of default terminal certificate and private key to set up a secure communication channel, so as to remotely and dynamically update the terminal transaction certificate, and accordingly, reducing the network access cost of terminals and shorting the network access period of terminals.

The above examples primarily explain the method and the system for initializing secure network access of POS terminals according to the invention. Although only some of the embodiments of the invention are described, it should be recognized by those skilled in the art that the present invention may be implemented in many other forms without departing from the subject and scope of the invention. Hence, it will be understood that the examples and embodiments showed in the invention should be regarded as illustrative rather than limiting, it is possible that many modifications and alternations are encompassed by the invention without departing from the spirit and scope of it as defined in the claims that follow.

What is claimed:

1. A method for initializing secure network access for POS terminals, which is used to connect a POS terminal to a terminal backend system, the method comprising:

loading a terminal default public key certificate, a default private key file, and a CA public key certificate of the terminal backend system into the POS terminal when leaving factory, wherein said terminal default public key certificate comprises a terminal transaction unique identifier;

after the POS terminal leaves factory and when initializing secure network access for the POS terminal, establishing a terminal transaction certificate secure downloading channel, wherein the terminal transaction certificate secure downloading channel is a mutual authenticated secure channel based on a secure socket layer (SSL)/transport layer security (TLS) protocol that utilizes said terminal default public key certificate, said default private key file, and said CA public key certificate of the terminal backend system for authentication, and the terminal transaction certificate secure downloading channel is used for downloading a terminal transaction certificate, between the POS terminal and the terminal backend system;

generating, by the POS terminal, a terminal transaction public/private key pair, storing the transaction private key within the POS terminal;

uploading, by the POS terminal, at least said terminal transaction public key and said terminal transaction unique identifier as a certificate signing request to the terminal backend system via the terminal transaction certificate secure downloading channel;

signing and issuing, by the terminal backend system, a terminal transaction certificate, wherein the terminal backend system generates the terminal transaction certificate based on the certificate signing request uploaded from the POS terminal via the terminal transaction certificate secure downloading channel, and returning the terminal transaction certificate to the POS terminal via the terminal transaction certificate secure downloading channel for downloading the terminal transaction certificate by the POS terminal;

after the terminal transaction certificate is downloaded by the POS terminal, establishing a secure channel for transaction for executing financial transactions between the POS terminal and the terminal backend system, according to the terminal transaction certificate, the transaction private key of said terminal transaction public/private key pair, and the CA public key certificate of the terminal backend system;

executing a first transaction between the POS terminal and the terminal backend system via the secure channel;

after executing the first transaction, receiving, by the POS terminal via the terminal transaction certificate secure downloading channel that utilizes said terminal default public key certificate, an updated terminal transaction certificate generated by the terminal backend system;

establishing an updated secure channel for the financial transactions between the POS terminal and the terminal backend system, according to the updated terminal transaction certificate; and executing a second transaction between the POS terminal and the terminal backend system via the updated secure channel;

wherein the terminal default public key certificate and the private key file is only used for accessing the terminal backend system and performing terminal management directed to the terminal transaction certificate secure downloading channel, and not used for executing the first transaction or the second transaction between the POS terminal and the terminal backend system.

2. The method of claim 1, wherein, posterior to establishing the secure channel for transactions, the method further comprises:

determining, by the terminal backend system, whether a transaction is able to be executed based on the terminal transaction unique identifier of the POS terminal accessed through said secure channel for transaction.

3. The method of claim 2, wherein the terminal transaction unique identifier is composed of a merchant ID and a terminal ID.

4. The method of claim 3, wherein, in issuing the terminal transaction certificate, the terminal backend system executes certificate signing for the transaction public key and the terminal transaction unique identifier uploaded from the POS terminal to generate the terminal transaction certificate.

5. The method of claim 1, wherein establishing the terminal transaction certificate secure downloading channel includes:

authenticating, through the SSL protocol, users and servers to ensure that data is sent to a correct client and a correct server, the data including the terminal transaction certificate;

encrypting, through the SSL protocol, the data to prevent the data from being stolen;

maintaining, through the SSL protocol, data integrity to ensure that the data is not altered during transmitting; and providing, through the TLS protocol, confidentiality and the data integrity between two communication applications.

* * * * *